Patented May 9, 1944

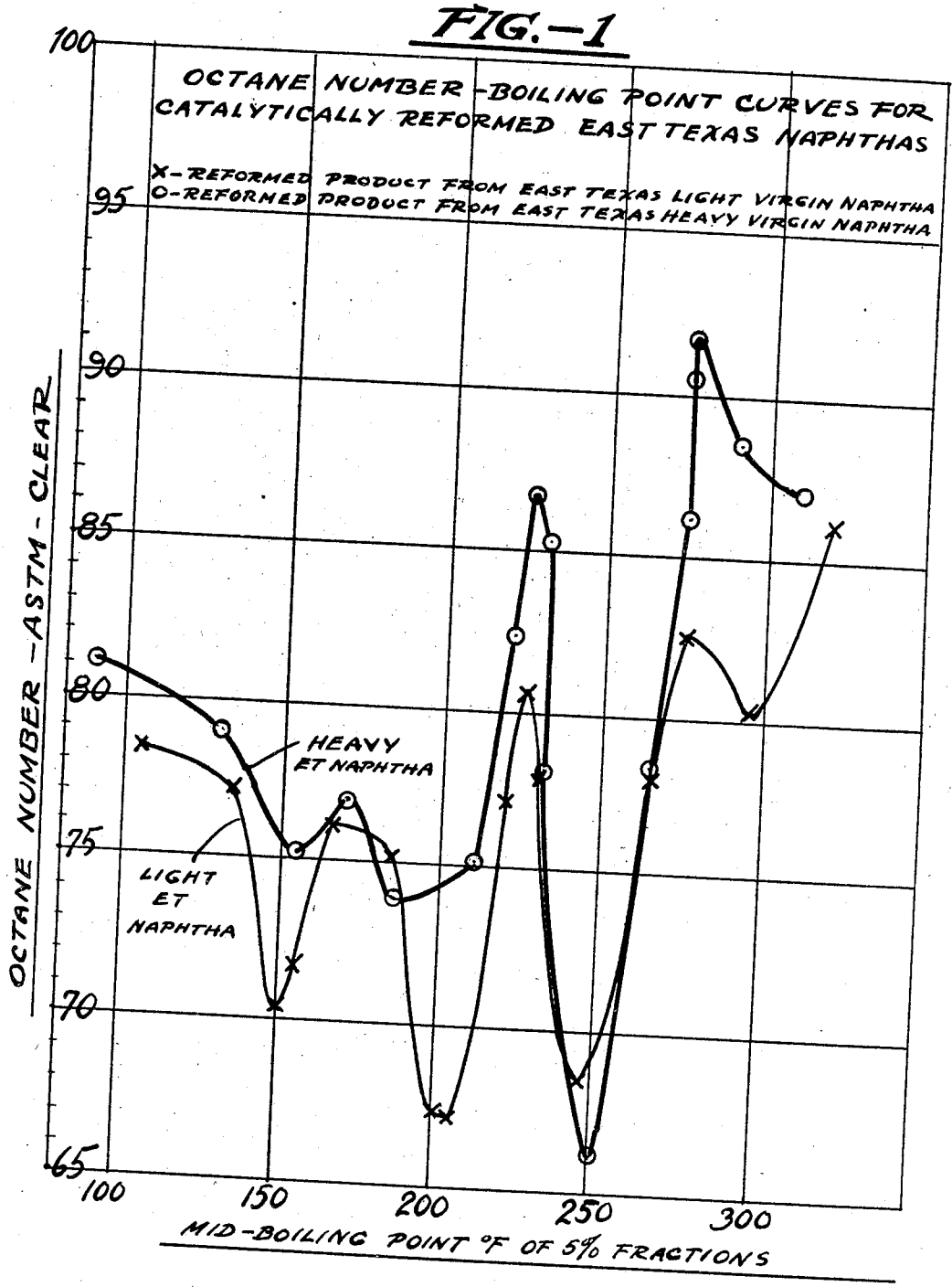

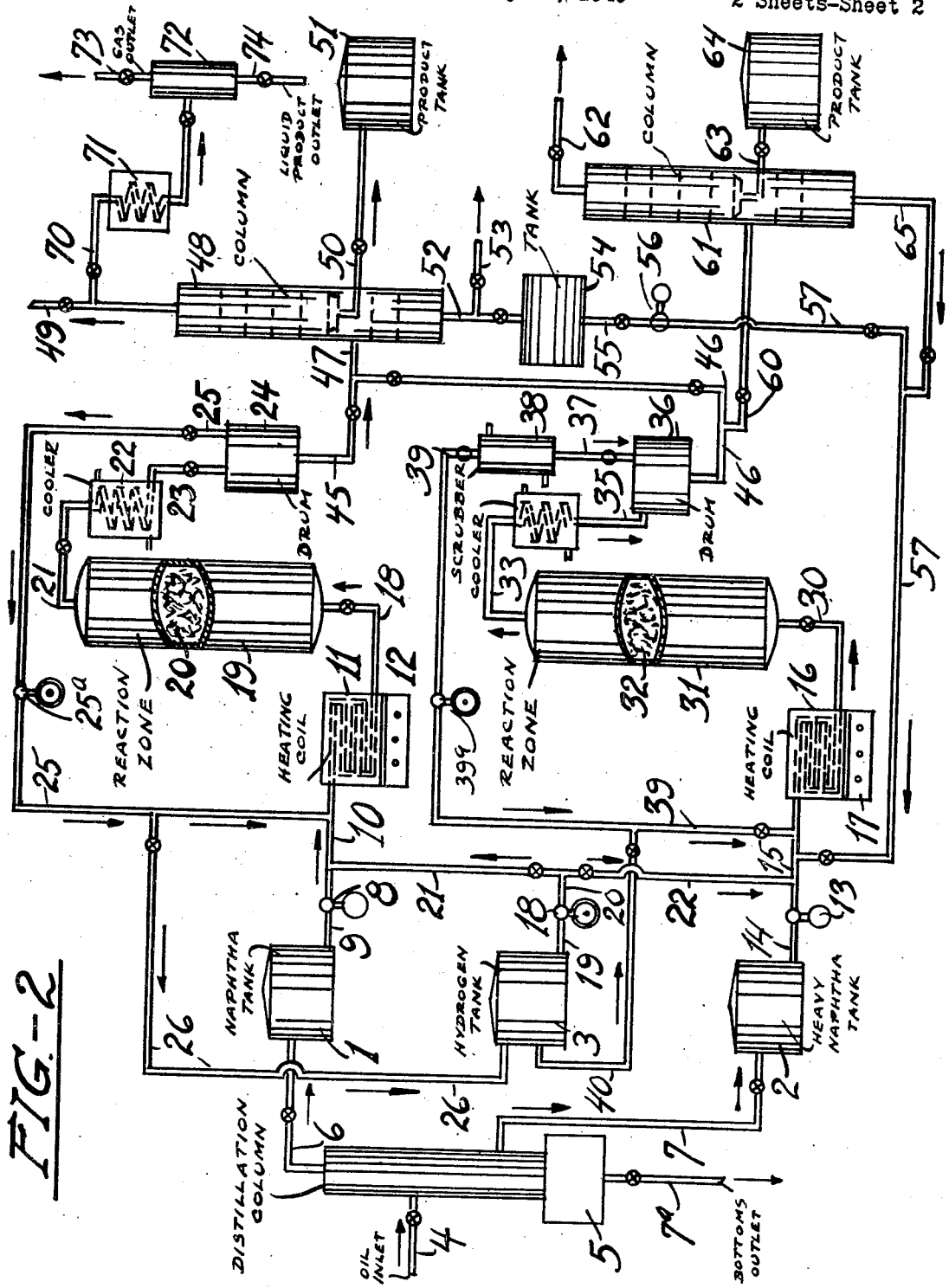

2,348,599

UNITED STATES PATENT OFFICE 2,348,599

PROCESS FOR MAKING AVIATION FUEL

Cecil L. Brown, Baton Rouge, La., assignor, by mesne assignments, to Standard Catalytic Company, a corporation of Delaware Application July 16, 1940, Serial No. 345,767

6 Claims. (Cl. 196—50)

This invention relates to the production of high octane number aviation fuels by a process of catalytic reforming in the presence of hydrogen, and is more particularly concerned with certain improvements therein the nature of which will be fully understood from the folowing description and the drawings in which:

Figure 1 is a graph of octane number versus boiling point for 5% fractions of the products obtained in the catalytic reforming in the presence of hydrogen of East Texas light and heavy virgin naphthas respectively; and Figure 2 is a semi-diagrammatic view in sectional elevation of one type of apparatus in which the process may be carried out.

The term "catalytic reforming" wherever used in the specification and claims shall be understood to mean any process of subjecting materials consisting essentially of hydrocarbons substantially boiling in the gasoline range to heat treatment at a temperature in excess of 500° F. and in the presence of catalysts to produce a dehydrogenated or otherwise chemically reconstructed product, for example of anti-knock characteristics superior to those of the starting material, with or without an accompanying change in molecular weight. By the term "chemically reconstructed" is meant something more than the mere removal of impurities or ordinary finishing treatments. The term catalytic reforming shall be understood to include, but not by way of limitation, reactions such as dehydrogenation, aromatization or cyclization, desulfurization, alkylation, polymerization and isomerization, all or some of which may occur to a greater or lesser extent during the process.

The term "catalytic reforming in the presence of hydrogen" wherever used in the specification and claims shall be understood to mean a process of catalytic reforming which is carried out in the presence of substantial quantities of free hydrogen or gases containing free hydrogen under such conditions that there is either no overall net consumption of free hydrogen or there is an overall net production of free hydrogen.

A typical process of catalytic reforming in the presence of hydrogen is one in which a naphtha is subjected to treatment at a temperature between 800 and 1050° F. under a pressure between slightly above atmospheric and about 750 pounds per square inch in the presence of from 2,000 to 10,000 cubic feet of gas per barrel of naphtha, the said gas containing between 20 and 90 mol percent of free hydrogen, in a suitable reaction zone which contains a catalytic material which promotes reforming such, for example, as a mixture of aluminum oxide and from 1 to 50% by weight of an oxide or sulfide of a metal of the IV, V, VI or VIII groups of the periodic system. The rate at which the naphtha is passed through the reaction zone is preferably between 0.2 and 5.0 volumes of liquid naphtha per volume of catalyst per hour. The particular conditions of operation within the above limits are preferably selected and from time to time, if necessary, adjusted so that the partial pressure of hydrogen in the reaction zone will be between about 4 and 20 atmospheres.

Characteristic of processes of catalytic reforming in the presence of hydrogen, as is true of many catalytic processes of this type, is the fact that the catalyst requires periodic regeneration in order to restore its activity to a satisfactory level. The catalyst, during a reaction cycle, progressively loses its reforming activity due to the deposition or formation on it of carbonaceous contaminants such as tarry matter and coke. These contaminants are removed during regeneration by passing hot inert gases containing regulated quantities of air or oxygen through the catalyst mass at a temperature which initiates combustion of said contaminants. The passage of these gases through the catalyst is continued until substantially no further combustible material remains thereon. Thereafter the flow of naphtha through the reaction zone may be resumed and continued until the catalyst again requires regeneration. The length of time the catalyst can be used in a reaction cycle before it requires regeneration varies with the type of feed stock, the severity of the operating conditions and the nature of the catalyst. If the catalytic reforming is conducted in the absence of substantial quantities of free hydrogen this time may be from 1 to 3 hours. When the catalytic reforming is conducted in the presence of hydrogen as is the case in the type of process with which the present invention is concerned, the length of the reaction cycle is appreciably prolonged. Indeed, the increase in the length of the reaction cycle is one of the principal advantages of conducting the catalytic reforming in the presence of hydrogen.

I have now found that the lower boiling fractions of an aviation fuel derived from the products of catalytically reforming a light naphtha in the presence of hydrogen are relatively low in octane number as compared with the remainder of said aviation fuel fraction and on the other hand that the lower boiling fractions of an aviation fuel derived from the products of catalytically reforming a heavy naphtha in the presence of hydrogen are characterized by a relatively higher octane number than the lower boiling fractions of an aviation fuel derived from the treatment of the light naphtha. This is illustrated graphically by Figure 1 which shows that the octane number of the light fractions from the product of catalytically reforming an East Texas heavy virgin naphtha in the presence of hydrogen averages higher than the octane number of the light fractions from a similar type of product obtained from an East Texas light virgin naphtha. In Figure 1 each fraction for which the octane number is given represents 5% by volume of the total product. The octane number of each fraction was separately determined and plotted against the mid-boiling point of the fraction. I have also observed that in the catalytic reforming in the presence of hydrogen of a light naphtha the rate at which carbonaceous contaminants are deposited on the catalyst is appreciably slower than is the case when catalytically reforming a heavy naphtha in the presence of hydrogen.

The present invention therefore consists in (1) subjecting a light and a heavy naphtha to catalytic reforming in the presence of hydrogen in separate reaction zones under conditions best adapted for each naphtha respectively and (2) separating the lower boiling fractions from the product of catalytically reforming the heavy naphtha in the presence of hydrogen and combining them with the higher boiling fractions of the aviation fuel derived from the product of catalytically reforming the light naphtha in the presence of hydrogen.

Referring to Figure 2, numeral 1 designates a supply of a light naphtha or any other hydrocarbon oil having an approximate boiling range between 100 and 300° F., and numeral 2 designates a supply of a heavy naphtha or any other hydrocarbon oil having an approximate boiling range between 200 and 400 or 450° F. The two hydrocarbon oils may have been derived from any source and it is immaterial whether they are rich or poor in sulfur or whether they contain predominantly paraffinic, naphthenic, olefinic or aromatic hydrocarbons. For example they may have been derived from the products of distillation, destructive distillation, cracking, catalytic cracking, hydrogenation or destructive hydrogenation of coals, tars, mineral oils, petroleum, shales, lignites, brown coal, bitumens, peats, pitches or any other solid, semi-solid or liquid carbonaceous materials or products thereof, or from the products of solvent extraction of hydrocarbon oils or from the products of synthetic processes such as the Fischer synthesis. Numeral 3 designates a supply of hydrogen or a gas rich in free hydrogen.

The supplies of light naphtha and heavy naphtha or low boiling and high boiling oils may already be available or they may be obtained from a hydrocarbon oil containing fractions boiling within the respective ranges desired with or without still higher boiling hydrocarbons. In this latter event, such an oil may be supplied through line 4 to a distillation means 5 and from said means a suitable light fractions may be removed from one point through line 6 and a suitable heavy fraction may be removed from another point through line 7. Bottoms are removed through a line 7a.

Pump 8 withdraws light naphtha from tank 1 through line 9 and forces it through line 10 into and through a heating means 11 which may be mounted in a suitable furnace setting 12.

Pump 13 withdraws heavy naphtha from tank 2 through line 14 and forces it through line 15 into and through a heating means 16 mounted in a suitable furnace setting 17.

Compressor 18 withdraws hydrogen from tank 3 through line 19 and forces it through line 20 which branches off into two lines 21 and 22, the first of which supplies hydrogen to line 10 and the second of which supplies hydrogen to line 15 so that a mixture of oil and hydrogen is formed which flows through the two heating means 11 and 16 respectively. Although in the drawings a mixture of oil and hydrogen is shown flowing through the heating means, it will be understood that the oil and hydrogen may be heated separately.

In heating means 11 the mixture of light naphtha and hydrogen is heated to a temperature which will be suitable to maintain the required temperature in the reaction zone into which it is presently to be introduced. The heated mixture leaves the heating means 11 through line 18a and flows into reaction zone 19a which contains a catalytic material 20a which promotes reforming. The nature of this catalyst will be fully disclosed below.

Reaction zone 19a is maintained at a temperature between 800 and 1050° F. preferably in the range between 900 and 950° F. and under a pressure between slightly above atmospheric and about 750 pounds per square inch. The quantity of gas introduced along with the oil is between 1,000 and 10,000 cubic feet per barrel of naphtha and this gas contains between 20 and 90 mol percent of free hydrogen, preferably between 30 and 70 mol percent. The rate at which the naphtha is passed through the reaction zone is between 0.2 and 5.0 volumes of liquid naphtha per volume of catalyst per hour. The particular conditions selected in these ranges should be such that the partial pressure of hydrogen is between about 4 and 20 atmospheres so that there will be an overall net production of free hydrogen.

Products of reaction leave reaction zone 19a through line 21a, flow through a cooling means 22a and then discharge through line 23 into a separating means 24 wherein gaseous and liquid products may be separated.

Gaseous products which will consist chiefly of hydrogen and smaller amounts of low molecular weight hydrocarbons such as methane, ethane and propane are removed from the separating means 24 through line 25 and may be recycled directly to line 10, preferably after being picked up by booster compressor 25a, or may be returned to the hydrogen supply tank 3 through lines 25 and 26.

Simultaneously with the passage of the light naphtha through reaction zone 19a, the mixture of heavy naphtha and hydrogen which has been heated in heating means 16 flows therefrom through line 30 into a second reaction zone 31 which contains a catalytic material 32 which promotes reforming. Reaction zone 31 may be substantially similar to reaction zone 19a and the catalyst 32 may have a composition which is the same as or different from that of catalyst 20a. The operating conditions of temperature, pressure, naphtha feed rate and volume of hydrogen per barrel of naphtha maintained in reaction zone 31 will fall within the same general ranges as outlined above in connection with reaction zone 19a but it is preferable in most cases to use a lower naphtha feed rate in reaction zone 31 than in reaction zone 19a.

Reaction products leave reaction zone 31 through line 33, pass through a cooling means 34 and then discharge through line 35 into a separating means 36. Gaseous products are removed from separating means 36 through line 37 and may be passed through a scrubbing means diagrammatically designated by numeral 38 in which a portion of the hydrocarbon constituents is removed from the gas in order to increase the concentration of hydrogen therein. The scrubbed gas is preferably returned directly to line 15 through line 39 and booster compressor 39a. A portion of it however may be returned to the hydrogen supply tank 3 through lines 39 and 40, particularly in the event that it is desired to increase the hydrogen concentration in the gas contained in said tank. It will be understood that a scrubbing means similar to 38 may be provided in line 25 which carries recycle gas to reaction zone 19a.

Any suitable means may be used to scrub the recycle gas. Perhaps the most convenient method is to scrub the gas with a light hydrocarbon oil under conditions at which hydrocarbons but substantially no hydrogen are absorbed from the gas.

Returning to the separating means 24 and 36 liquid products are removed therefrom through lines 45 and 46 respectively and the mixture of the two is introduced through line 47 into a fractionating means 48 wherein the said liquid products may be separated into fractions which boil in the aviation fuel range, and above and below this range. Fractions which are too volatile for aviation fuel are removed from the fractionating means through line 49 and may be passed to a gas absorption system or otherwise disposed of. Fractions boiling in the desired aviation fuel range, say between 100 and 300° F., are removed through line 50 and collected in a storage tank 51. Fractions too high boiling for aviation fuel, boiling above say about 300° F. are removed from the fractionating means through line 52. They may be removed from the system through line 53 and used for motor fuel or for blending with motor fuel or they may be collected in a tank 54 from which they may be withdrawn through line 55 by means of pump 56 and recycled to line 15 through line 57.

If it is not desirable to fractionate the products from both reaction zones in the same fractionating means as might be the case, for example, where only a narrow fraction of the product from reaction zone 31 is to be blended with the aviation fuel fraction separated from the product of reaction zone 19a the liquid products leaving separating means 36 through line 46 may be diverted through line 60 into a second fractionating means 61 from which the too volatile fractions are removed through line 62 and the desired narrow fraction is removed through line 63 and collected in tank 64 from which it may be removed and blended in any suitable proportions with the product collected in tank 51. The remainder of the liquid product is removed from fractionating means 61 through line 65 and recycled to line 15 through line 57 as already described.

It will also be understood that the fractionating means 48 and 61 may be so regulated that a fraction comprising the higher boiling constituents of the desired aviation fuel is separated in fractionating means 48 and then a fraction comprising the lower boiling constituents of the desired aviation fuel will be separated in fractionating means 61 thus replacing the relatively lower octane number low boiling fractions of the product from reaction zone 19a by the relatively higher octane number lower boiling fractions of the product from reaction zone 31. In this type of operation it is desirable to pass the vapors leaving fractionating means 48 through line 49 through a line 70 into a cooling means 71 and then collecting the cooled product in a separating means 72 wherefrom gases may be removed through line 73 and liquids through line 74.

The catalysts 20a and 32 used in reaction zones 19a and 31 respectively may be selected from a wide variety of different materials which promote reforming and the same or a different type of catalyst may be used in each zone. Among suitable catalysts for this purpose are mixtures of aluminum oxide in any of its various forms with from 1 to 50% by weight of an oxide or sulfide of a metal of the II, IV, VI or VIII groups of the periodic system. Mixtures of aluminum oxide with oxides of chromium, molybdenum, tungsten, vanadium, cobalt and nickel are especially effective. The aluminum oxide may be in the form of alumina gel, peptized or partially peptized alumina gel, bauxite, or activated alumina. It may be pretreated with hydrofluoric or fluosilicic acid. The catalyst mixture can be prepared by mechanical mixing of the various ingredients, by impregnating the alumina with a solution of a salt of the other metal or metals and then heating to convert the said salt to the oxide, or by co-precipitating the hydroxides of aluminum and the other metal or metals. The catalysts can be used in stationary or powdered form. In the former case they are preferably used in the form of small lumps, granules, tablets, pills, pellets, cubes or other pieces of relatively small dimension.

In the operation of the process, the flow of naphtha through the reaction zones 19a and 31 respectively is continued until the catalyst requires regeneration. Ordinarily the catalyst 20a in reaction zone 19a will not require regeneration as frequently as catalyst 32 in reaction zone 31 because it will be found that even under the most favorable conditions the rate of deposition of carbonaceous contaminants on the catalyst is greater in the zone in which the heavier naphtha is treated. When regeneration in either zone is necessary the flow of oil and hydrogen therethrough is stopped and hot inert gases containing regulated quantities of oxygen are passed through the catalyst mass in order to burn off the carbonaceous matter. It will be understood that two or more reaction zones may be used in parallel so that while the catalyst in one zone is being regenerated, another zone may be on a reaction cycle, thus making continuous operation possible. If the catalyst is used in powdered form, regeneration can not of course be in situ but must be accomplished outside the reaction zone. The method of regeneration however may be substantially the same.

The following example illustrates the application of the improved process:

*Example*

A light naphtha derived from an East Texas crude and a heavy naphtha derived from an East Texas crude having the following respective characteristics:

|  | | Light naphtha | Heavy naphtha |
|---|---|---|---|
| Gravity | °A.P.I. | 63.0 | 51.0 |
| Initial boiling point | °F. | 120 | 241 |
| Final boiling point | °F. | 334 | 416 |
| Octane number | A.S.T.M. | 59.0 | 42.5 | are each subjected to catalytic reforming in the presence of hydrogen under the following respective conditions:

|  |  | Light naphtha | Heavy naphtha |
|---|---|---|---|
| Temperature | °F. | 978 | 975 |
| Pressure | lbs./sq. in. | 200 | 200 |
| Feed rate | v./v./hr. | 1.0 | 0.5 |
| Recycle gas rate | cu. ft./bbl. naphtha | 2,000 | 2,500 |
| Per cent $H_2$ in gas |  | 61 | 52 |
| Catalyst |  | (¹) | (¹) |
| Length of reaction cycle | hours | 6 | 3 |

¹ Activated alumina and molybdenum oxide.

The octane numbers of the aviation fraction from the catalytically reformed light naphtha, and of the same fraction from the catalytically reformed heavy naphtha are as follows:

|  | Aviation naphtha from light naphtha | Aviation naphtha from heavy naphtha |
|---|---|---|
| Octane number, A. S. T. M.-C. F. R. motor method | 75.0 | 79.6 |
| +3 cc. lead | 88.2 | 92.3 |
| Octane number, A. S. T. M.-C. F. R. research method (1939) | 82.6 |  |
| +3 cc. lead | 94.8 |  |

The lighter fraction (100–230° F. cut) of the above product from the catalytically reformed light naphtha is replaced with a cut of the same boiling range from the product from the catalytically reformed heavy naphtha and the octane number of the mixture is then as follows:

Octane number, A. S. T. M.-C. F. R. motor
method ---------------------------------- 75.9
  +3 cc. lead ---------------------------- 88.8
Octane number, A. S. T. M.-C. F. R. research method (1939) ---------------- 85.1
  +3 cc. lead ---------------------------- 97.2

Thus it will be seen that the substitution of the lighter fractions of the product from the reforming of the heavy naphtha for the similar fraction in the product of reforming the light naphtha has increased the octane number of the product of reforming the light naphtha from 75 to 75.9 by the C. F. R. motor method, and from 82.6 to 85.1 by the C. F. R. research test method.

This invention is not limited by any theories of the mechanism of the reactions nor by any details which have been given merely for purposes of illustration, but is limited only in and by the following claims in which it is intended to claim all novelty inherent in the invention.

I claim:

1. An improved process for preparing an aviation fuel of high octane number which comprises separately and simultaneously subjecting a hydrocarbon oil having a boiling range between about 100 and 300° F. and a hydrocarbon oil having a boiling range between about 200 and 450° F. to catalytic reforming in the presence of hydrogen, removing the lower boiling normally liquid fractions from the product of treating the lighter oil and replacing said lower boiling fractions with the lower boiling fractions from the product of treating the heavier oil.

2. An improved process for preparing an aviation fuel of high octane number which comprises separately and simultaneously subjecting a light naphtha and a heavy naphtha to catalytic reforming in the presence of hydrogen, segregating from the products of reforming the light naphtha the higher boiling fractions of the desired aviation fuel, segregating from the products of reforming the heavy naphtha the lower boiling fractions of the desired aviation fuel and blending the higher and lower boiling fractions so obtained to produce the desired aviation fuel.

3. An improved process for preparing an aviation fuel of high octane number which comprises subjecting a hydrocarbon oil having a boiling range between about 100 and 300° F. to catalytic reforming in the presence of hydrogen, separately and simultaneously subjecting a hydrocarbon oil having a boiling range between about 200 and 450° F. to catalytic reforming in the presence of hydrogen, selecting from the products of reforming the lower boiling of the two oils the higher boiling fractions of the desired aviation fuel, selecting from the products of reforming the higher boiling of the two oils the lower boiling fractions of the desired aviation fuel, and blending the higher boiling and lower boiling fractions so selected to produce the desired aviation fuel.

4. An improved process for preparing an aviation fuel of high octane number which comprises separately and simultaneously subjecting a light naphtha and a heavy naphtha to catalytic reforming in the presence of substantial quantities of hydrogen under conditions such that there is a net production of free hydrogen in the reaction, selecting from the products of reforming the light naphtha the higher boiling fractions of the desired aviation fuel, selecting from the products of reforming the heavy naphtha the lower boiling fractions of the desired aviation fuel, and blending the higher boiling and lower boiling fractions so obtained to produce the desired aviation fuel.

5. Process according to claim 4 in which the light naphtha and the heavy naphtha are subjected to catalytic reforming in the presence of hydrogen at a temperature between 800 and 1050° F., under a pressure between slightly above atmospheric and 750 pounds per square inch and in the presence of between 1000 and 10,000 cubic feet per barrel of naphtha of a gas containing between 20 and 90 mol percent of free hydrogen.

6. An improved process for preparing an aviation fuel of high octane number which comprises subjecting a light naphtha and a heavy naphtha separately and simultaneously to catalytic reforming in the presence of hydrogen, segregating from the products of reforming each naphtha a fraction boiling in the aviation fuel range, segregating from the aviation fraction obtained from the products of reforming the light naphtha a fraction boiling between 100 and 230° F., and replacing this fraction with a fraction of the same boiling range segregated from the aviation fraction obtained from the products of reforming the heavy naphtha.

CECIL L. BROWN.